Patented July 14, 1925.

1,545,819

UNITED STATES PATENT OFFICE.

GEORGE HOLLAND ELLIS, OF SPONDON, NEAR DERBY, ENGLAND, ASSIGNOR TO AMERICAN CELLULOSE AND CHEMICAL MANUFACTURING COMPANY LIMITED, A CORPORATION OF DELAWARE.

DYEING OR COLORING OF PRODUCTS MADE WITH CELLULOSE ACETATE.

No Drawing.    Application filed September 25, 1923. Serial No. 664,782.

*To all whom it may concern:*

Be it known that I, GEORGE HOLLAND ELLIS, a subject of the King of Great Britain, of Spondon, near Derby, England, have invented certain new and useful Improvements Relating to the Dyeing or Coloring of Products Made with Cellulose Acetate, of which the following is a specification.

This invention relates to the dyeing, coloring, printing or stencilling (hereinafter all included in the term dyeing) of yarns, threads, fabrics or other products consisting of or containing cellulose acetate.

Many dyestuffs have been proposed for use on acetyl cellulose, for example azo dyestuffs, alizarine dyestuffs, basic dyestuffs of the triphenyl methane, oxazine and thiazine series, "gallocyanine" derivatives, etc. It has not hitherto been proposed, however, to employ for this purpose the class of dyestuffs which are coloring matters of the substituted quinonemonoimide series generally comprised within the term "indophenols," one member of which class, viz:—dimethyl para-amidophenyl-1:4-naphthoquinonemonoimide, at one time found some application for other fibres, but is now practically obsolete.

It has now been found that this class of coloring matters is particularly useful for acetyl cellulose, many of the members of the class having very good direct "affinity" or dyeing properties for acetyl cellulose and yielding those shades, e. g., blues and violets, which are not easily obtainable in simple azo dyestuffs. The results, moreover, are often very resistant to light and soaping.

The said class of coloring matters may be applied in various ways to the goods consisting of or containing cellulose acetate.

According to methods set forth in the specifications of my other U. S. applications Serial Number 664,780 and Serial Number 664,781 they are proposed to be applied in the unreduced state in the form of solubilized modifications prepared by treatment with classes of solubilizing agents referred to in my said other specifications respectively.

According to the present specification the coloring matters of the said class are applied by reducing the coloring matter to the state of its leuco body by the use of suitable reagents such as sodium hydrosulphite, stannous salts, etc., and applying it to the materials in the state of the leuco body. This can be easily absorbed from dye baths and may be oxidized on the material either by the air during or subsequently to the dyeing process, or by means of suitable oxidizing agents such as hypochlorites, peroxides, etc., after completion of the dyeing.

Other methods of applying the said coloring matters consisting, as above mentioned, in applying the coloring matters in the unreduced state in the form of solubilized modifications obtained by treating them with one or more solubilizing agents of the character referred to in the specification of my application for U. S. Patent S. No. 664,780, filed September 25, 1923, or with one or more solubilizing agents referred to in the specification of my application for U. S. Patent S. No. 664,781, filed September 25th, 1923, or with mixtures of any of the solubilizing agents referred to in both these specifications. The solubilizing agents referred to in the first mentioned U. S. Specification S. No. 664,780 comprise as stated therein, bodies having oily or fatty characteristics containing one or more salt forming groups capable of forming soluble salts with alkalies or ammonia, for example the sulpho group or the carboxyl group, or salts of such bodies, such for instance as their sodium or other alkali salts or ammonium salts. In particular said solubilizing agents comprise sulpho ricinoleic acid and other sulphated fatty acids, or salts thereof such as referred to; they also comprise other bodies having oily or fatty characteristics such as oleic, stearic and palmitic acid, and salts of such bodies such as their sodium or other alkali or ammonium salts. As stated in the said specification mixtures of any of such solubilizing bodies or salts may be employed.

The solubilizing agents referred to in my said other U. S. application S. No. 664,781 comprises, as stated therein, a wide range of non-oleaginous organic compounds being organic derivatives containing in their structure one or more salt forming groups, e. g., the sulphonic, carboxyl or hydroxyl groups, whether the compound contains only one kind of these groups or different kinds of these groups at the same time; for example one may employ phenols, sulphonic acids, carboxylic acids, phenol sulphonic acids or other derivatives of the benzene, naphthalene or anthracene series containing one or more of any of these groups; or derivatives of other cyclic hydrocarbons, saturated or non-saturated, containing one or more of the above mentioned groups, such for example as the naphthenic acids, naphthene sulphonic acids or other carboxylic or sulphonic acids of the cyclo paraffins; or one may employ the sodium or other salts of one or more of any of the above mentioned derivatives.

Also it is stated in my said U. S. application S. No. 664,781 that one or more of the solubilizing agents therein referred to may be employed alone or together with one or more of the solubilizing agents referred to in my first mentioned U. S. application S. No. 664,780 for preparing the solubilized modifications of the coloring matters or organic compounds to be applied to the materials or products consisting of or containing cellulose acetate.

It is to be understood that other dyes may or may not be employed in combination or association with the coloring matters of the class aforesaid in the same operation or separate operations for the production of compound shades on acetyl cellulose.

The coloring matters of the said class may likewise be applied for the stencilling or printing of yarns, threads, fabrics, or other goods consisting of or containing cellulose acetate and may be employed for this purpose in the form of any suitable pastes or preparations containing thickening agents or other appropriate materials.

The practical application of the present invention may be illustrated by the following example, it being understood that this is given only as an instance and can be varied widely.

*Example.*—To dye a deep royal blue on 100 kilos of acetyl cellulose yarn in hanks. Add 1 kilo of caustic soda flakes to 1 kilo of dimethyl-para-amido-phenyl-1:4 naphthoquinone monoimide

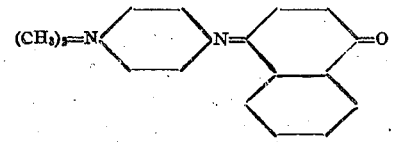

then add 100 litres of water at 60° C. Into the mixture sprinkle 2 kilos of sodium hydrosulphite powder and maintain at this temperature till completely reduced. Filter the solution into a dyebath containing soft water at 50° C., to which have been added ½-gram of sodium hydrosulphite per litre and 2 cc. of 20% ammonia per litre. Volume of bath about 30:1 calculated on the weight of the goods. Enter the goods and work for 1½ hours, maintaining the temperature and adding a little alkali or hydrosulphite from time to time as required to keep the dyestuff solution reduced. Then remove the goods and rinse in cold, soft water. Then oxidize in a bath containing 2 grams of sodium perborate per litre, at a temperature of 40° C. for half an hour. Remove the goods, rinse, and finish and dry as may be desired.

What I claim and desire to secure by Letters Patent is:—

1. A process for dyeing yarns, threads, fabrics and other products comprising cellulose acetate, said process comprising the application thereto of a coloring matter of the series comprised within the term indophenols, in the reduced state.

2. In a process according to claim 1, the employment of dimethyl para-amido-phenyl-1:4 naphtho quinone monoimide in the reduced state.

In testimony whereof I have hereunto subscribed my name.

GEORGE HOLLAND ELLIS.